United States Patent [19]
Hing

[11] Patent Number: 5,638,993
[45] Date of Patent: Jun. 17, 1997

[54] FLUID DISPENSER FOR USE WITH POWER TOOLS

[76] Inventor: Michael Ong Hing, 125 N. Pinal Ave., Superior, Ariz. 85273

[21] Appl. No.: 429,851

[22] Filed: Apr. 24, 1995

[51] Int. Cl.⁶ .................................................. B67D 5/06
[52] U.S. Cl. .................. 222/191; 222/385; 184/6.14; 184/28
[58] Field of Search .................. 184/6.14, 15.3, 184/28; 222/191, 385

[56] References Cited

U.S. PATENT DOCUMENTS

| | | | |
|---|---|---|---|
| 710,184 | 9/1902 | Clements | 184/6.14 X |
| 2,206,730 | 7/1940 | Philquist et al. | 222/191 X |
| 2,916,749 | 12/1959 | Ingwer et al. | 184/6.14 X |
| 3,763,962 | 10/1973 | Gottlieb | 222/191 X |

*Primary Examiner*—Gregory L. Huson

[57] ABSTRACT

A dispenser for selectively dispensing oil onto a cutting member of a power tool. The inventive device includes a reservoir attachable to or integral with a body of a power drill. A dispensing assembly extends from the reservoir into close proximity to a drill bit of the drill. A pump assembly extends from the reservoir for operation by a digit of a human hand to effect dispensing of a fluid from the reservoir and onto the drill bit.

14 Claims, 4 Drawing Sheets

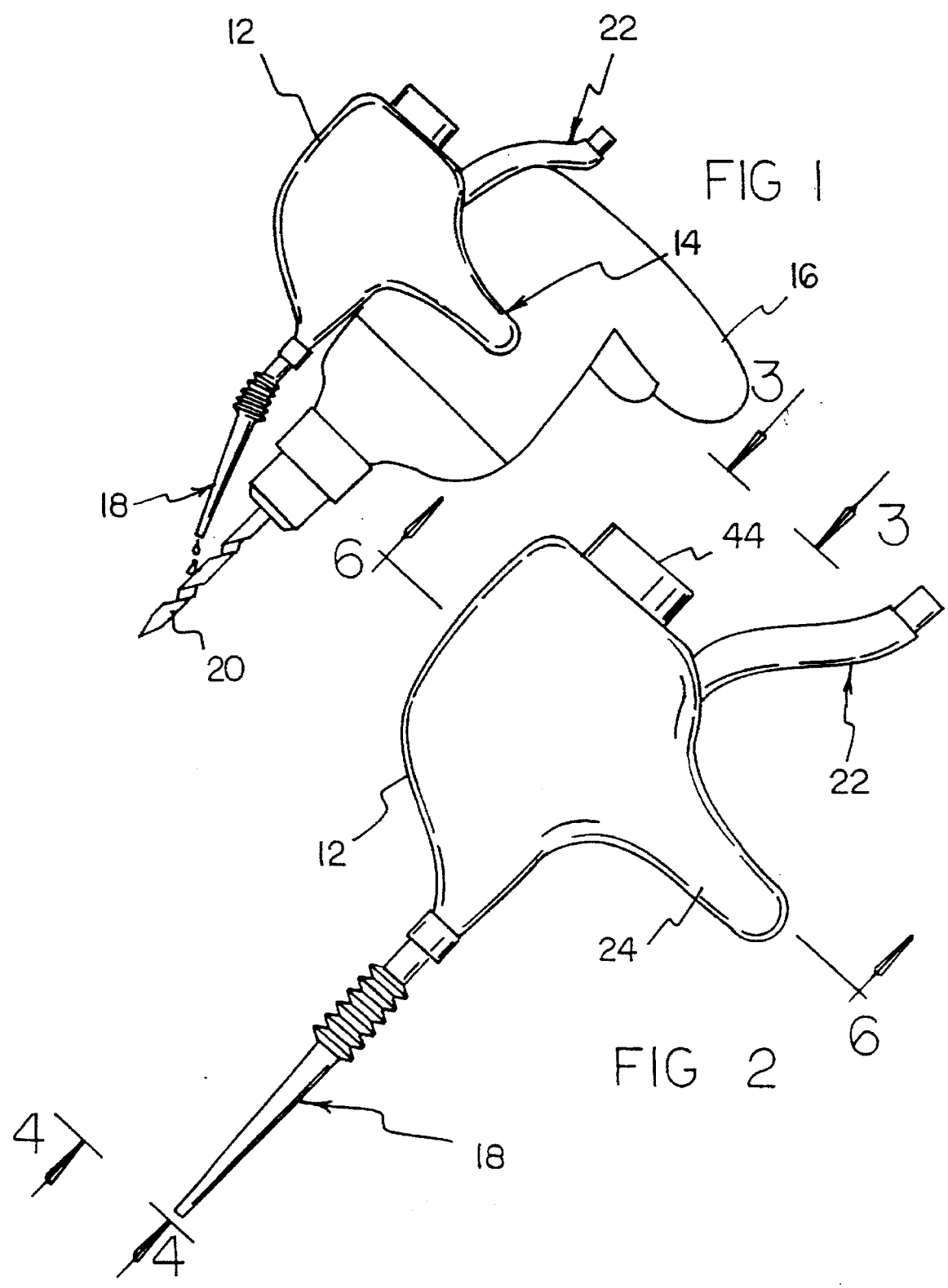

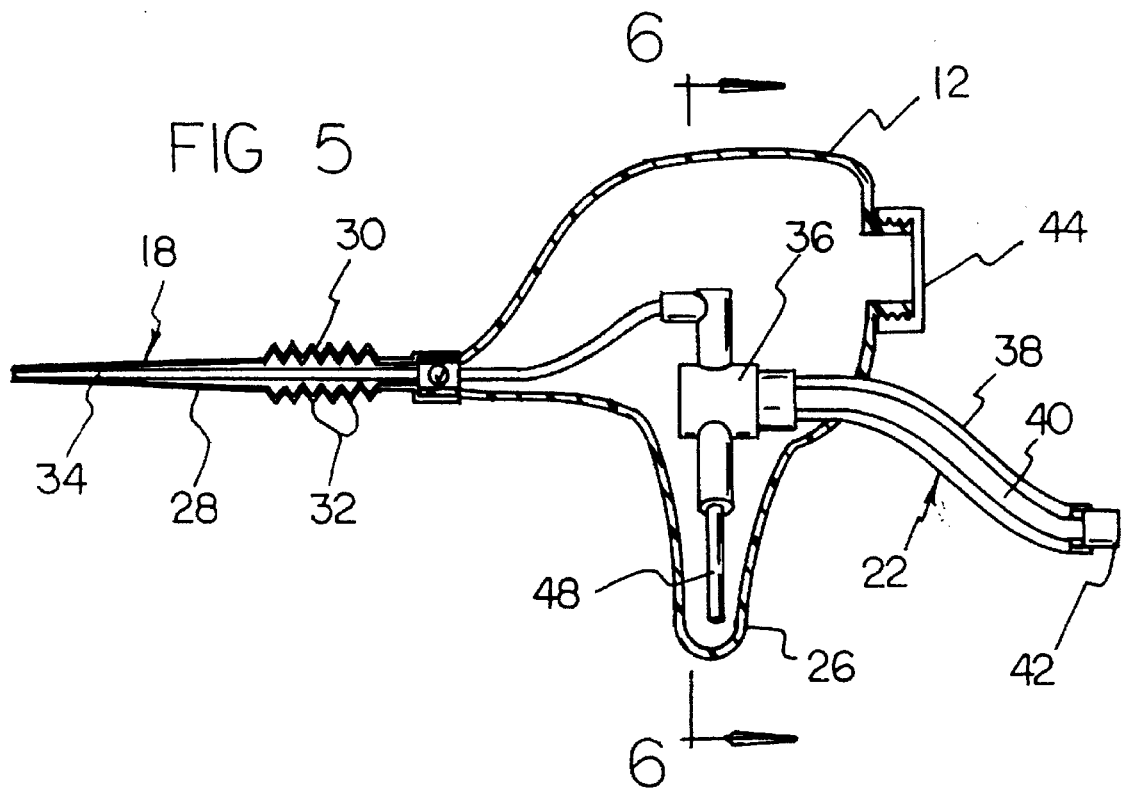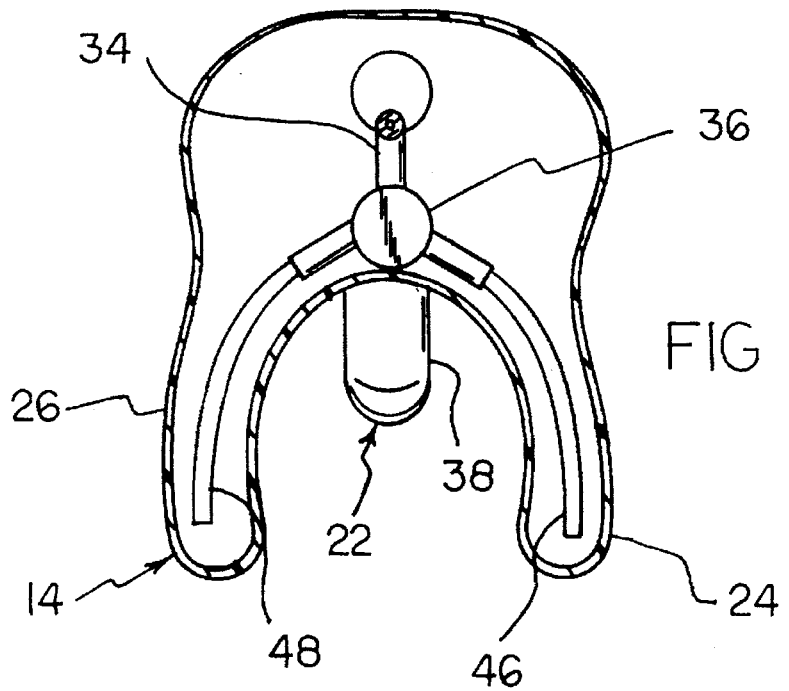

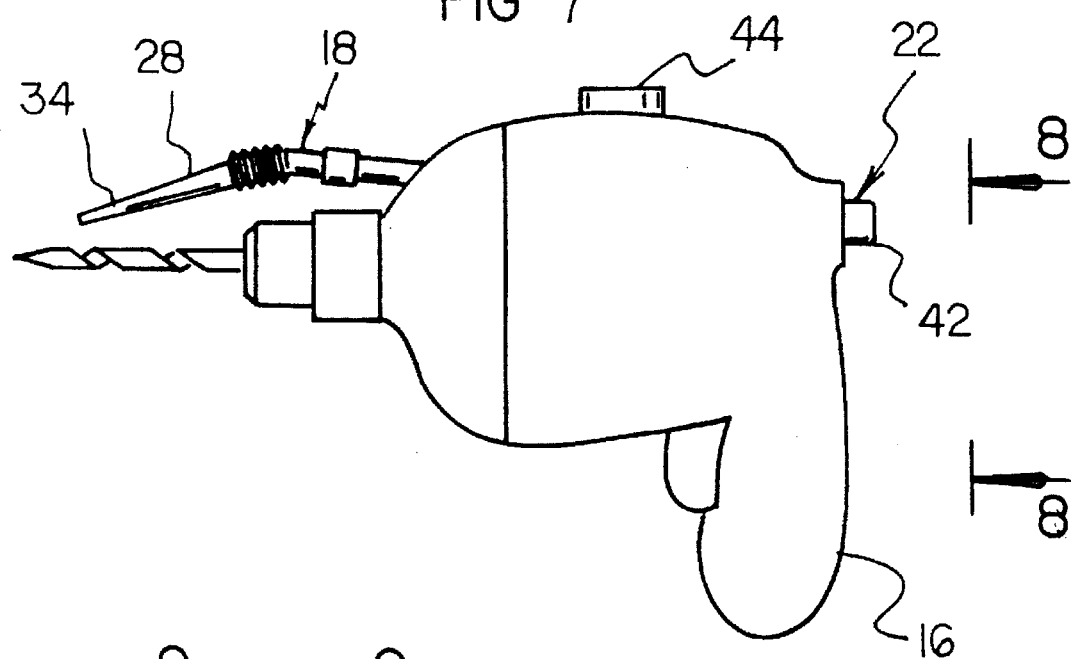
FIG 7
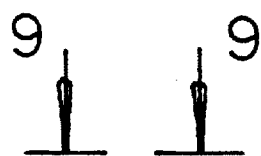
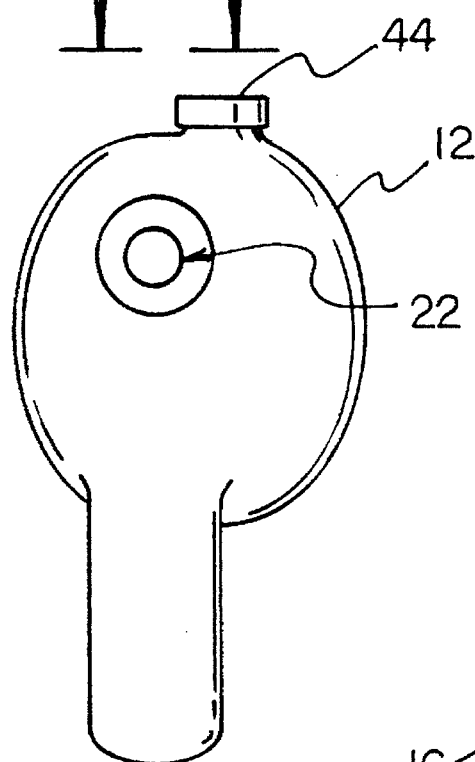
FIG 8
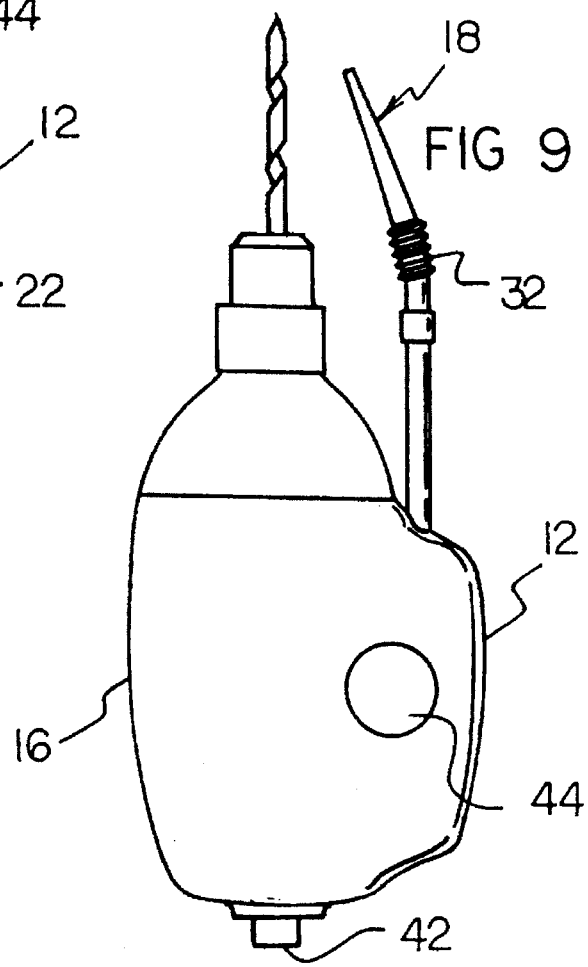
FIG 9

5,638,993

FLUID DISPENSER FOR USE WITH POWER TOOLS

BACKGROUND OF THE INVENTION

1. Field of the Invention

The present invention relates to dispensing devices and more particularly pertains to an power tool fluid dispenser for selectively dispensing oil onto a cutting member of a power tool.

2. Description of the Prior Art

The use of dispensing devices is known in the prior art. More specifically, dispensing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art dispensing devices include U.S. Pat. No. 4,664,565; U.S. Pat. No. 4,687,385; U.S. Pat. No. 4,949,813; U.S. Pat. No. 4,345,668, and U.S. Pat. No. 3,436,990.

While these devices fulfill their respective, particular objectives and requirements, the aforementioned patents do not disclose a power tool fluid dispenser for selectively dispensing oil onto a cutting member of a power tool which includes a reservoir attachable to or integral with a body of a power drill, a dispensing assembly extending from the reservoir into close proximity to a drill bit of the drill, and a pump assembly extending from the reservoir for operation by a digit of a human hand to effect dispensing of a fluid from the reservoir onto the drill bit of the power drill.

In these respects, the power tool fluid dispenser according to the present invention substantially departs from the conventional concepts and designs of the prior art, and in so doing provides an apparatus primarily developed for the purpose of selectively dispensing oil onto a cutting member of a power tool.

SUMMARY OF THE INVENTION

In view of the foregoing disadvantages inherent in the known types of dispensing devices now present in the prior art, the present invention provides a new power tool fluid dispenser construction wherein the same can be utilized for dispensing oil onto a drill bit of a power tool. As such, the general purpose of the present invention, which will be described subsequently in greater detail, is to provide a new power tool fluid dispenser apparatus and method which has many of the advantages of the dispensing devices mentioned heretofore and many novel features that result in a power tool fluid dispenser which is not anticipated, rendered obvious, suggested, or even implied by any of the prior art dispensing devices, either alone or in any combination thereof.

To attain this, the present invention generally comprises a dispenser for selectively dispensing oil onto a cutting member of a power tool. The inventive device includes a reservoir attachable to a body of a power drill. A dispensing assembly extends from the reservoir into close proximity to a drill bit of the drill. A pump assembly extends from the reservoir for operation by a digit of a human hand to effect dispensing of a fluid from the reservoir and onto the drill bit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power tool fluid dispenser apparatus and method which has many of the advantages of the dispensing devices mentioned heretofore and many novel features that result in a power tool fluid dispenser which is not anticipated, rendered obvious, suggested, or even implied by any of the prior art dispensing devices, either alone or in any combination thereof.

It is another object of the present invention to provide a new power tool fluid dispenser which may be easily and efficiently manufactured and marketed.

It is a further object of the present invention to provide a new power tool fluid dispenser which is of a durable and reliable construction.

An even further object of the present invention is to provide a new power tool fluid dispenser which is susceptible of a low cost of manufacture with regard to both materials and labor, and which accordingly is then susceptible of low prices of sale to the consuming public, thereby making such power tool fluid dispensers economically available to the buying public.

Still, yet another object of the present invention is to provide a new power tool fluid dispenser which provides in the apparatuses and methods of the prior art some of the advantages thereof, while simultaneously overcoming some of the disadvantages normally associated therewith.

Still another object of the present invention is to provide a new power tool fluid dispenser for selectively dispensing oil onto a cutting member of a power tool.

Yet another object of the present invention is to provide a new power tool fluid dispenser which includes a reservoir attachable to or integral with a body of a power drill, a dispensing assembly extending from the reservoir into close proximity to a drill bit of the drill, and a pump assembly extending from the reservoir for operation by a digit of a human hand to effect dispensing of a fluid from the reservoir onto the drill bit of the power drill.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of a power tool fluid dispenser according to the present invention in use.

FIG. 2 is a side elevation view of the invention, per se.

FIG. 5 is a cross sectional view taken along line 5—5 of FIG. 4.

FIG. 6 is a cross sectional view taken along line 6—6 of FIG. 2.

FIG. 7 is a side elevational view of an alternative form of the invention with the reservoir being integrally formed into a housing of a power tool.

FIG. 8 is an end elevational view of the alternative form of the invention as viewed from line 8—8 of FIG. 7.

FIG. 9 is a top plan view of the alternative form of the invention as viewed from line 9—9 of FIG. 8.

DESCRIPTION OF THE PREFERRED EMBODIMENT

Figure 3:
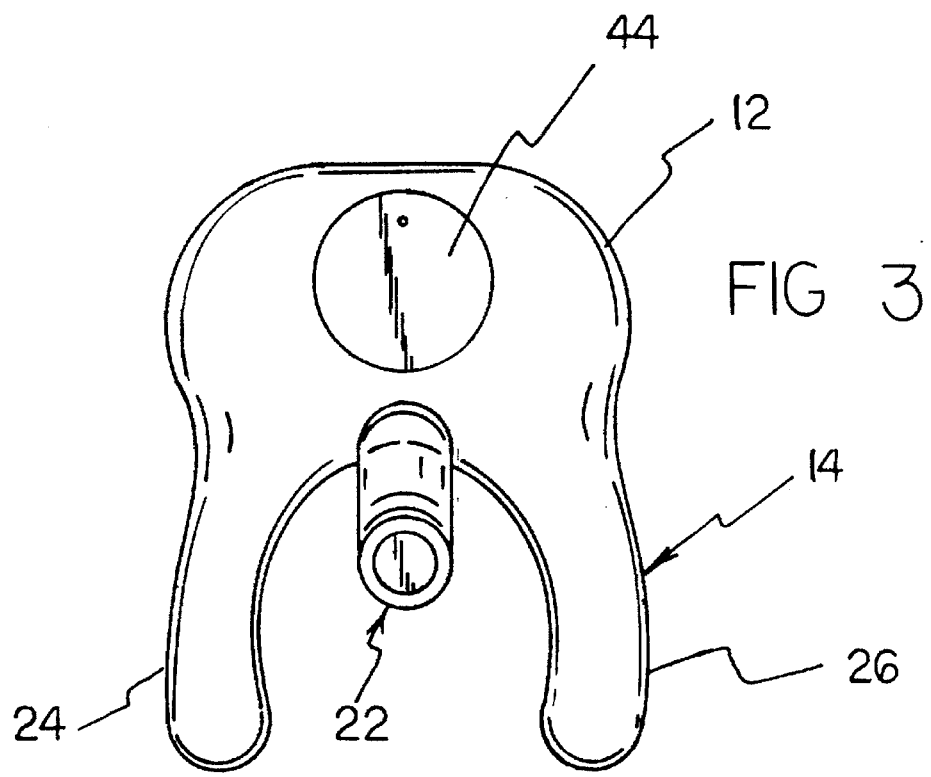
FIG. 3 is a rear elevation view of the invention.

With reference now to the drawings, and in particular to FIGS. 1–9 thereof, a new power tool fluid dispenser embodying the principles and concepts of the present invention and generally designated by the reference numeral 10 will be described.

More specifically, it will be noted that the power tool fluid dispenser 10 comprises a reservoir 12 of hollow construction operable to receive and store a fluid, such as a lubricating oil or the like, therewithin. A mounting means 14 is coupled to the reservoir 12 for selectively securing the reservoir to a power tool, such as the drill 16 illustrated in FIG. 1 of the drawings. A dispensing means 18 extends from the reservoir 12 and is positioned in fluid communication with an interior of the reservoir for directing fluid from the reservoir onto a cutting tool, such as drill bit 20, of the power toot or drill 16. A pump means 22 extends from the reservoir 12 and can be selectively operated by a digit of a human hand for pumping fluid from the reservoir 12 through the dispensing means 18. By this structure, an individual utilizing the power tool or drill 6 can lubricate the cutting member or drill bit 20 while simultaneously effecting operation of the drill.

Figure 4:
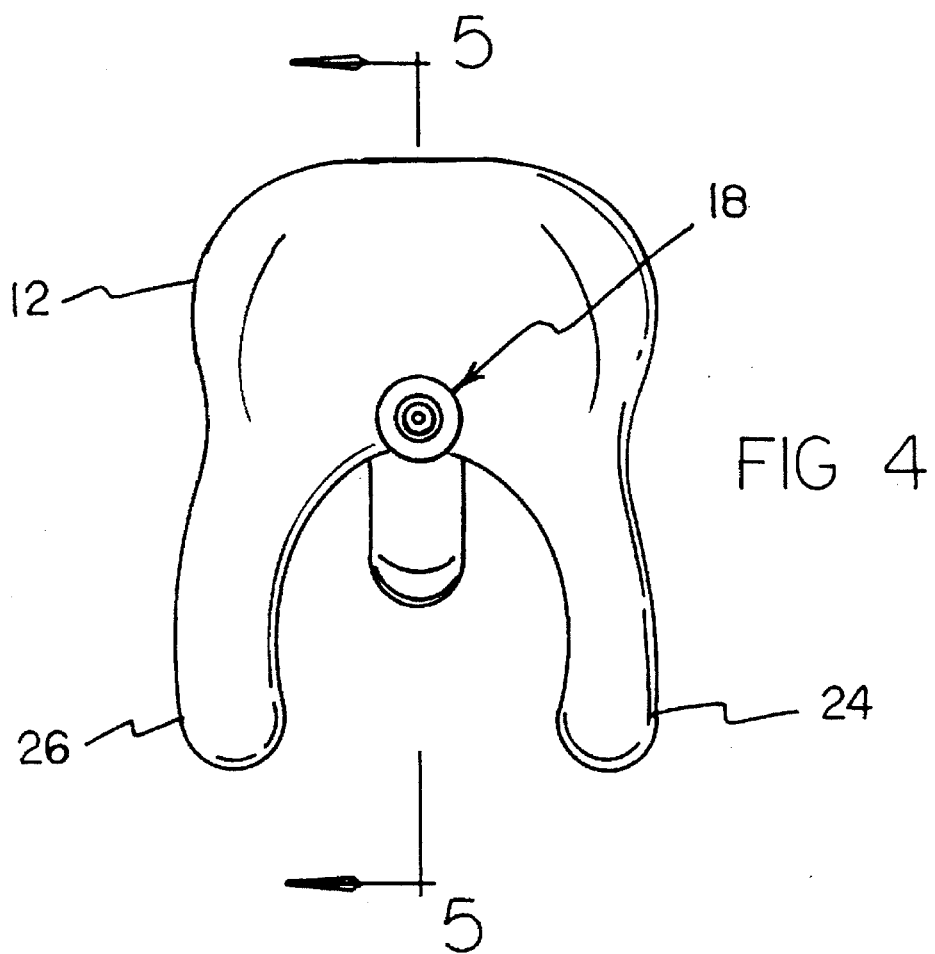
FIG. 4 is a front elevation view of the invention.

As best illustrated in FIGS. 2 through 4, it can be shown that the mounting means 14 according to the present invention 10 preferably comprises a first mounting leg 24 extending from a first side of the reservoir 12, and a second mounting leg 26 extending from a second side of the reservoir 12. The mounting legs 24 and 26 extend in a substantially spaced orientation and are constructed so as to be resiliently deformable such that the drill 16 can be positioned therebetween. The mounting legs 24 and 26 are slightly arcuate in configuration and cooperate to frictionally engage an exterior of the drill 16 when positioned therebetween as shown in FIG. 1. By this structure, the reservoir 12 can be easily coupled to an upper or back surface of the drill 16 as desired.

As best illustrated in FIG. 5, it can be shown that the dispensing means 18 according to the present invention 10 preferably comprises an elongated nozzle 28 having a flexible section 30 permitting articulation of the nozzle 28 relative to the reservoir 12 to which it is attached. To this end, the flexible section 30 comprises a plurality of accordion folds 32 formed into the nozzle 28 which cooperate with a deformable material of which the nozzle 28 is constructed to permit articulation of an outer free distal end of the nozzle. A flexible tube 34 projects through a center of the nozzle 28 and into fluid communication with the reservoir 12. If desired, the nozzle 28 can be formed of a substantially ductile material, such as a soft metal or the like, such that a plastic deformation of the accordion folds 32 of the flexible section 30 will retain the nozzle 28 in a desired position relative to the reservoir 12. By this structure, fine nozzle 28 can be selectively positioned into close proximity with a cutting member or drill bit 20 of the drill 16 as shown in FIG. 1.

Referring now to FIG. 6 with concurrent reference to FIG. 5, it can be shown that the pump means 22 according to the present invention 10 preferably comprises a reciprocating piston pump 36 positioned within the reservoir 12 and in fluid communication with the flexible tube 34. A guide 38 extends from the reciprocating pump 36 exteriorly of the reservoir 12 and movably supports therewithin a compression on transfer member 40. The compression transfer member 40 terminates in a push button 42 which can be depressed by a digit of a human hand of an individual operating the drill 16 to effect operation of the reciprocating piston pump 36 within the reservoir 12. Preferably, the guide 38 is substantially rigid in configuration, with the compression transfer member 40 comprising a flexible tube permitting lateral deformation thereof but yet being substantially resistant to longitudinal deformation. A semi-rigid hollow plastic tube can be utilized to construct the compression transfer member 40, wherein such hollow tube will articulate through the guide 38 to transfer compressive forces from the pusin button 42 to the reciprocating piston pump 36. By this structure, the push button 42 can be actuated to dispense oil or other fluids from within the reservoir 12 through the flexible tube 34 of the nozzle 28 onto the cutting member or drill bit 20 of the drill 16. To facilitate an addition of oil or other fluids to the reservoir 12, a removable cap 44 is threadably coupled thereto and includes an unlabeled vent aperture extending therethrough permitting free operation of the reciprocating piston pump 36 as describe above.

As best illustrated in FIG. 6, the first and second mounting legs 24 and 26 are preferably substantially hollow in configuration, with the hollow interiors thereof being in fluid communication with the reservoir 12. The reciprocating piston pump 36 thus further includes a first dip tube 46 extending downwardly from the reservoir 12 and into the hollow interior of the first mounting leg 24. Similarly, a second did tube 48 extends from the reciprocating piston pump 36 and into the hollow interior of the second mounting leg 26. By this structure, small amounts of fluid residing within the reservoir 12 are concentrated into a confined space for consumption by the reciprocating piston pump 36.

Referring now to FIGS. 7 through 9 wherein an alternative form of the present invention 10 is illustrated in detail, it can be shown that the reservoir 12 can be integrally formed into the housing 50 of the power tool or drill 16. Preferably, the reservoir 12 extends laterally of the housing 50 and includes therewithin the reciprocating piston pump 36 and other components as as illustrated for the invention within FIG. 1 through 6 of the drawings.

In use, the power tool fluid dispenser 10 according to the present invention can be easily coupled to a power tool, such as the drill 16 illustrated in FIG. 1. The pump means 22 of the invention 10 can be selectively operated by a thumb or finger of a human hand holding the drill 16 to effect dispensing of oil or other fluids from the reservoir 12 onto the drill bit 20 through the nozzle 28 of the dispensing means 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and rose, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A power tool fluid dispenser comprising:

a reservoir of hollow construction operable to receive and store a fluid;

a mounting means coupled to the reservoir for removably securing the reservoir to the exterior of a portable handheld power tool;

a dispensing means extending from the reservoir and positioned in fluid communication with an interior of the reservoir for directing fluid from the reservoir onto a cutting tool; and a pump means extending from the reservoir for selective operation by a digit of a human hand for pumping fluid from the reservoir through the dispensing means.

2. A power tool fluid dispenser comprising:

a reservoir of hollow construction operable to receive and store a fluid;

a mounting means coupled to the reservoir for selectively securing the reservoir to a power tool;

a dispensing means extending from the reservoir and positioned in fluid communication with an interior of the reservoir for directing fluid from the reservoir onto a cutting tool;

a pump means extending from the reservoir for selective operation by a digit of a human hand for pumping fluid from the reservoir through the dispensing means, wherein the mounting means comprises a first mounting leg extending from a first side of the reservoir; and a second mounting leg extending from a second side of the reservoir, the mounting legs extending in a substantially spaced orientation relative to one another such that a power tool can be positioned therebetween to mount the reservoir relative to the power tool.

3. The power tool fluid dispenser of claim 2, wherein the dispensing means comprises an elongated nozzle extending from fluid communication with the reservoir.

4. The power tool fluid dispenser of claim 3, wherein the elongated nozzle includes a flexible section permitting articulation of a portion of the nozzle relative to the reservoir.

5. The power tool fluid dispenser of claim 4, wherein the flexible section comprises a plurality of accordion folds formed into the nozzle.

6. The power tool fluid dispenser of claim 5, wherein the nozzle is formed of a substantially ductile material such that a plastic deformation of the accordion folds of the flexible section will retain the nozzle in a desired position relative to the reservoir.

7. The power tool fluid dispenser of claim 6, wherein the pump means comprises a reciprocating piston pump positioned within the reservoir and in fluid communication with an exterior of the reservoir through the nozzle; a guide extending from the reciprocating pump exteriorly of the reservoir; and a compression transfer member movably positioned within the guide; the compression transfer member terminating in a push button which can be depressed by a digit of a human hand to effect operation of the reciprocating piston pump within the reservoir.

8. The power tool fluid dispenser of claim 7, wherein the first and second mounting legs are substantially hollow and positioned in fluid communication with the reservoir.

9. The power tool fluid dispenser of claim 8, wherein the reciprocating piston pump further includes a first dip tube extending downwardly from the reciprocating piston pump and into a hollow interior of the first mounting leg, and a second dip tube extending from the reciprocating piston pump and into a hollow interior of the second mounting leg.

10. A power tool fluid dispenser comprising:

a portable handheld power tool having a housing;

a reservoir of hollow construction operable to receive and store a fluid, the reservoir being mounted to the housing of the power tool;

a dispensing means in fluid communication with an interior of the reservoir, the dispensing means comprising an elongate dispensing nozzle extending from the reservoir and having a dispensing nozzle free end adjustably positionable to permit the directing of fluid from the reservoir onto a cutting tool;

a pump means extending from the reservoir for selective operation by a digit of a human hand for pumping fluid from the reservoir through the dispensing means.

11. The power tool fluid dispenser of claim 10, wherein the elongated nozzle includes a flexible section between substantially stiff sections to permit articulation of a portion of the nozzle relative to the reservoir.

12. The power tool fluid dispenser of claim 11, wherein the flexible section comprises a plurality of accordion folds formed into the nozzle.

13. The power tool fluid dispenser of claim 12, wherein the nozzle is formed of a substantially ductile material such that a plastic deformation of the accordion folds of the flexible section will retain the nozzle in a desired position relative to the reservoir.

14. The power tool fluid dispenser of claim 13, wherein the pump means comprises a reciprocating piston pump positioned within the reservoir and in fluid communication with an exterior of the reservoir through the nozzle; a guide extending from the reciprocating pump exteriorly of the reservoir; and a compression transfer member movably positioned within the guide; the compression transfer member terminating in a push button which can be depressed by a digit of a human hand to effect operation of the reciprocating piston pump within the reservoir.

* * * * *